United States Patent [19]

Holt et al.

[11] Patent Number: 5,713,507
[45] Date of Patent: Feb. 3, 1998

[54] PROGRAMMABLE FRICTION STIR WELDING PROCESS

[75] Inventors: Elmo S. Holt, Bellflower; Lawrence J. Lang, Rowland Heights, both of Calif.

[73] Assignee: Rockwell International Corporation, Seal Beach, Calif.

[21] Appl. No.: 619,364

[22] Filed: Mar. 21, 1996

[51] Int. Cl.⁶ .................................................. B23K 20/12
[52] U.S. Cl. .................................. 228/112.1; 228/234.1
[58] Field of Search ........................... 228/112.1, 114.5, 228/119, 234.1, 2.1, 2.3

[56] References Cited

U.S. PATENT DOCUMENTS 4,122,990   10/1978   Tasaki et al. ............................ 228/2.3

FOREIGN PATENT DOCUMENTS 001393567   5/1988   U.S.S.R. ................................ 228/2.3
001712107   2/1992   U.S.S.R. ................................ 228/2.3

OTHER PUBLICATIONS

Industrie–Anzeiger, "Das Verbinden von CrNi–Stahl mit Aluminium und Al–Legierungen nach dem Reibschweissverfahren" May 26, 1970.

The Welding Institute, Research Report, Joining Aluminium to Steel–A review . . . Friction Welding . . . Jun. 1979.

*Primary Examiner*—Samuel M. Heinrich
*Attorney, Agent, or Firm*—Harry B. Field; Steven E. Kahm

[57] ABSTRACT

A variable pin length stir friction welding method wherein the stir friction welding pin penetrates the workpiece as the workpiece translates. The stir friction welding pin starting at a zero penetration and extending to the depth needed to repair a weld or to make a weld. Then withdrawing the pin to zero penetration as the work is translated. The weld path is thus ramped into and out of the workpiece leaving no holes which need to be repaired. Circumferential welds can be made by keeping the pin extended to the welding depth for at least one complete revolution of the weld.

4 Claims, 2 Drawing Sheets

5,713,507

PROGRAMMABLE FRICTION STIR WELDING PROCESS

BACKGROUND OF THE INVENTION

1. Field of the Invention

This invention relates to friction stir welding and more particularly to a method for friction stir welding and weld repairing using an adjustable pin.

2. Description of the Related Art

The Welding Institute in Cambridge, England has developed a method of joining materials by fiction stir welding (see U.S. Pat. No. 5,460,317). This method employs a tool having a pin which is plunged into and stirs the material to be joined to a plastic state. The pin preferably has threads for forcing the plasticized material downward and backward (see British patent application number 9405491.3 filed Mar. 21, 1994). When the pin is moved along the laying surface the plasticized material flows from the front of the pin downward and to the rear of the pin as the pin translates the faying surface. A shoulder at the top of the pin keeps plasticized material from leaving the joint region.

The pin length in the prior art has been fixed. The pin depth must be controlled to a very close tolerance to ensure a complete weld with the pin tip being within 0.002 inches from the bottom of the faying surface. The plate thickness has had to be constant for the welds to work and tools would have to be changed for each different welding job with different thickness plates.

It has been the practice to start the friction stir welding process with the friction stir welding pin drilling a hole in the material to be joined and then translating the pin along the faying surface to join two plates. Then the pin is withdrawn leaving a hole which has to be filled.

In the past with conventional welding, pores, cracks and other defects would have to be detected and the material covering the defect ground out to expose the defect before it could be repaired by rewelding.

SUMMARY OF THE INVENTION

A friction stir welding tool having an accurately adjustable pin length relative to the shoulder of the tool can be programmed to slowly enter the plate as the plate translates, thus eliminating the need to drill a hole to begin the process. The pin then slowly extents to the desired depth to either weld or repair the material along the pins path. The pin is then gradually withdrawn from the work piece as the pin translates through the material until it is withdrawn. Using this method no holes are left in the material which have to be filled in later.

When welding a circular work piece the friction stir weld tool can slowly penetrate the work as it rotates and be withdrawn slowly after a complete weld is made around the circumference. Thus no holes are left in the work and it becomes possible to make tanks or other objects completely sealed with one welding step.

Cracks, pores and other defects in a weld at any depth in a workpiece can be repaired be using the programmable friction stir welding process. The pin in the programmable stir welding process stirs the material in the defect area into a plastic state and mixes it with the material in the surrounding volume thus cleaning out the defect and rewelding in one step.

For variable thickness workpieces to be welded the adjustable pin depth can be used to weld the entire thickness of the workpiece adjusting the depth of the pin as needed while the workpiece is being translated.

OBJECTS OF THE INVENTION

It is an object of the invention to repair defective welds.

It is another object of the invention to use the friction stir welding process without leaving holes in the workpiece.

It is also an object of the invention to weld variable thickness plates.

It is also an object of the invention to weld plates having different thicknesses without having to change tools.

It is a further object of the invention to make circumferential welds leaving no holes to be repaired.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
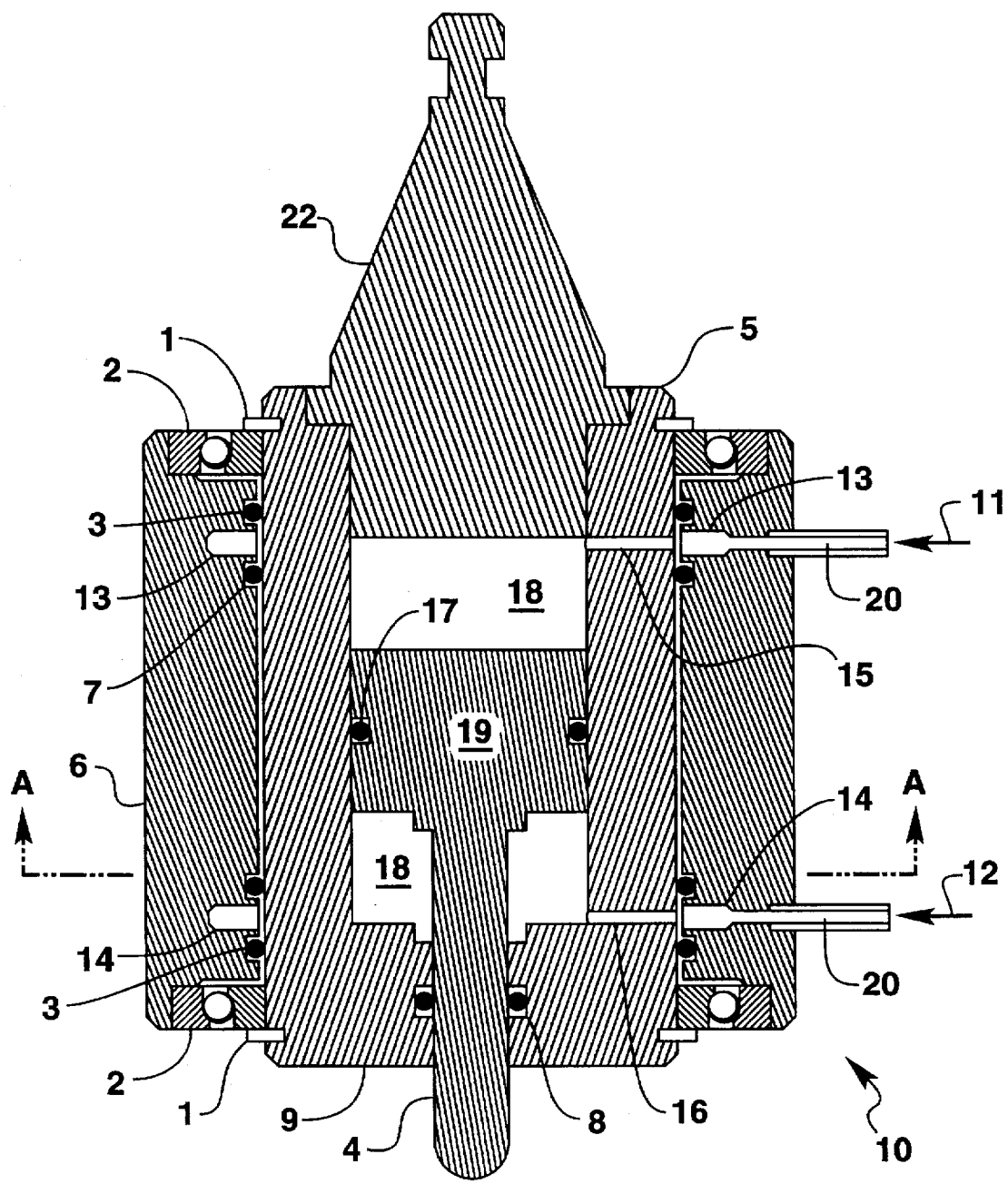
FIG. 1 is a sectional view of a variably adjustable friction stir welding pin.

FIG. 1 shows a stir friction welding tool 10 having a means for extending and retracting a stir friction welding pin 4 relative to the shoulder 9 of the tool 10. Although the means shown as a hydraulic means any means such as a mechanical, electromechanical or electric means may be used. Copending patent application Ser. No. 08/620,060, applicants docket number 95ST036 filed on even date herewith, is attached hereto made a part hereof and incorporated herein by reference to show another means of varying the pin length in a stir friction welding tool.

In the embodiment of FIG. 1 the pin length from the shoulder can vary from zero to up to approximately ½ inch although larger extensions are possible. The body 5 has a circumferential stationary slip ring 6 around the outer perimeter of body 5 for supplying hydraulic fluid 20 to piston chamber 18.

Figure 2:
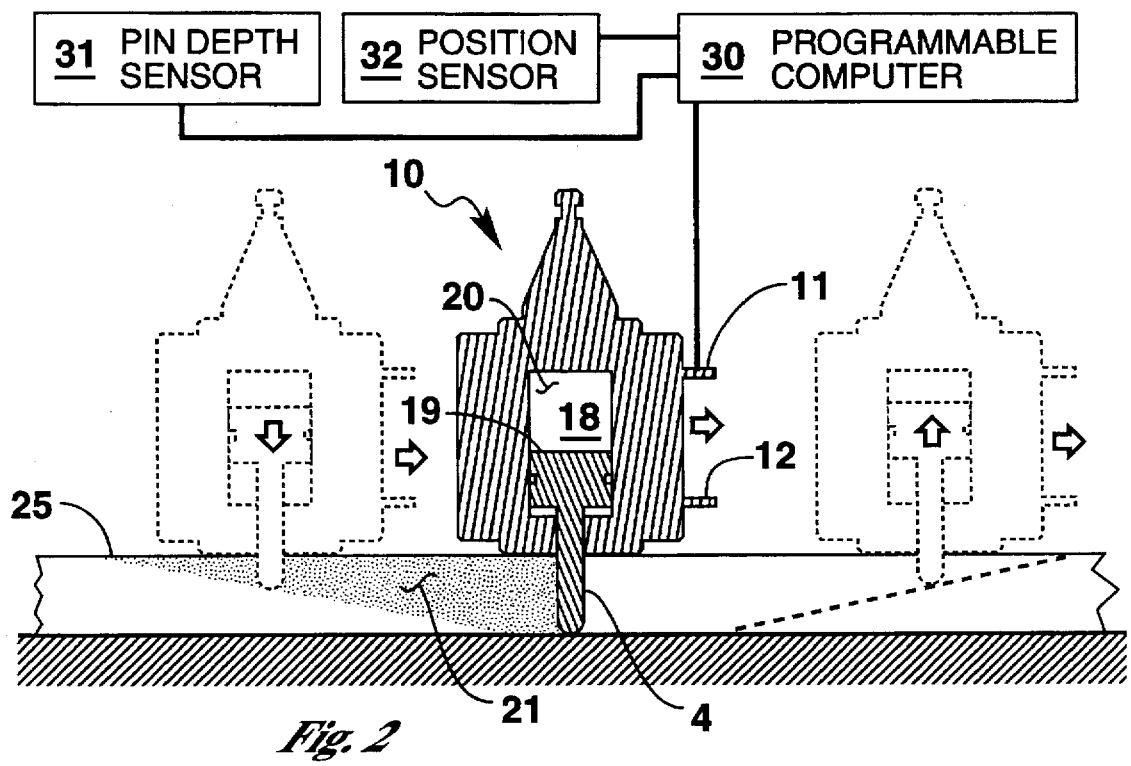
FIG. 2 is a series of side views of the pin tracking through a work piece being welded.

As seen in FIG. 2 when hydraulic fluid 20 is added to the top of the piston chamber 18 through fluid entry tube 11 piston 19 and pin 4 is forced downward into workpiece 25 to be welded. When hydraulic fluid 20 is added to the bottom of piston chamber 18 through fluid entry tube 12 piston 19 and pin 4 is forced upward. In this manner the depth of the pin 4 in work piece 25 is controlled. The means of translating the workpiece 25 is not shown as it is part of a standard machine tool in which stir friction tool 10 is placed.

Hydraulic fluid 20 enters the piston chamber 18 by passing from the fluid entry tubes 11, 12 through slip ring 6 to reservoirs 13, 14 which ring the body 5. Ports 15 and 16 in body 5, connect the piston chamber 18 inside of body 5 to the circumferential reservoirs 13 and 14 respectively in slip ring 6, thus providing continuous hydraulics pressure while body 5 is rotating relative to slip ring 6. Seals 7, 8, 17 and o-rings 3 prevent hydraulic fluid 20 from leaking. Snap rings 1 and bearings 2 keep the body 5 and slip ring 6 in rotating alignment.

Figure 3:
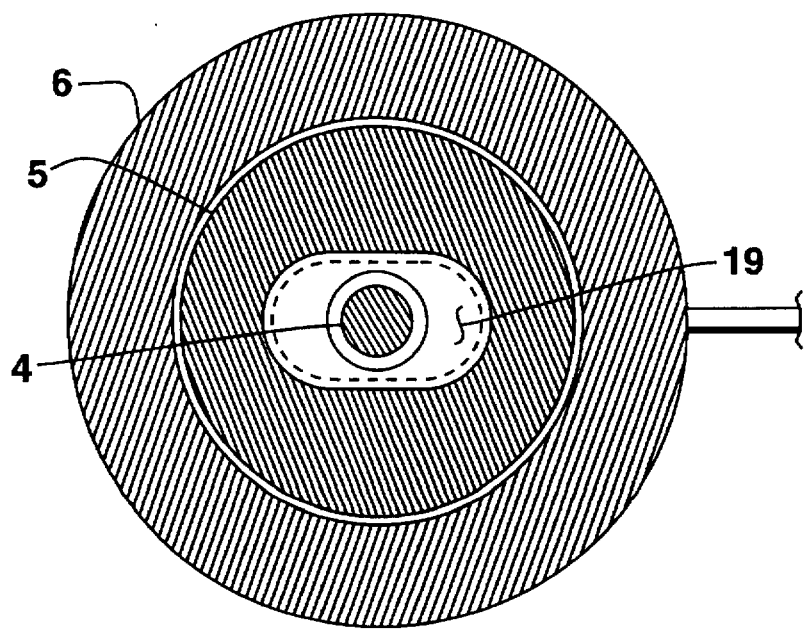
FIG. 3 is a bottom view of the piston and pin taken along line A—A of FIG. 1.

FIG. 3 shows a bottom cross section view of the piston 19 which slides up and down in body 5.

The pin 4 should fit tightly into shoulder 9 to prevent plasticized material from the weld entering the body 5 of stir friction welding tool 10. Alternatively a seal can be employed to prevent plasticized material from entering the body 5 of stir friction welding tool 10. It is also important for this embodiment that no hydraulic fluid 20 leak from the bottom of the piston 19 down the pin 4 to the weld area 21 contaminating the weld.

A method of making a continuous circumferential weld in a circular workpiece 25 such as a tank is possible once an extendible pin 4 for stir friction welding is provided. In this method the pin 4 is at a zero depth when the shoulder 9 is placed adjacent to the workpiece 25 before welding begins. As the workpiece 25 is translated relative to the tool 10 the pin 4 is gradually extended into the workpiece 25. As shown in FIG. 2 the pin 4 ramps down to the depth needed for joining or for repairing. Shaded area shows the area welded 21. When the weld or repair is completed pin 4 is slowly withdrawn such that the pin 4 ramps up and out from the workpiece 25.

When welding a Circumferential workpiece 25 the pin 4 is extended to the welding depth for an entire revolution of the workpiece 25 and then withdrawn.

If a workpiece 25 has a variable depth the pin 4 can be extended and retracted to constantly weld to the desired depth.

A programmable computer 30 controls the translation of the workpiece 25 relative the pin 4 and keeps track of the workpiece position relative the pin for programmable welding or repairing of the workpiece. Pin depth sensors 31 feed information about the pin depth to the programmable computer 30 to perform the weld to the desired depths in the workpiece. Many types of pin depth sensors are available. In the embodiment shown the hydraulic fluid 20 added to the piston chamber 18 is measured to yield the pin 4 position.

The rates at which the pin 4 is rotated and extended varies with the translation speed of the workpiece, the material of the workpiece, pin size, pin material, shoulder width and other factors.

U.S. Pat. No. 5,460,317 issued Oct. 24, 1995 and British application number 9405491.3 filed Mar. 21, 1994 are attached hereto and hereby incorporated by reference to teach the general principles of friction stir welding.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A method for stir friction welding a workpiece using a variable length pin stir friction welding tool comprising:

placing a variable length pin stir friction welding tool having a shoulder and a pin on a workpiece to be welded, with the pin fully retracted, rotating the pin and translating the workpiece relative to the pin while extending the pin into the workpiece, translating the workpiece relative to the pin while welding with the pin extended to the desired depth, translating the workpiece relative to the pin while withdrawing the pin from the workpiece.

2. A method for stir friction welding a workpiece using a variable length pin stir friction welding tool as in claim 1 wherein, the pin is extended to the depth needed to make a repair in the workpiece.

3. A method for stir friction welding a workpiece using a variable length pin stir friction welding tool as in claim 1 wherein, the pin is variably extended to the depth needed to weld the workpiece such that variable thickness workpieces can be welded.

4. A method for stir friction welding a workpiece using a variable length pin stir friction welding tool as in claim 1 wherein, a circumferential workpiece is welded by extending the pin for at least one complete revolution of the circumferential workpiece.

\* \* \* \* \*